(12) United States Patent
Koelsch

(10) Patent No.: US 9,178,371 B2
(45) Date of Patent: Nov. 3, 2015

(54) PUDDLE LIGHT WITH STATUS DISPLAY

(71) Applicant: Ford Global Technologies, LLC, Dearborn, MI (US)

(72) Inventor: Peter Koelsch, Ransbach-Baumbach (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 20 days.

(21) Appl. No.: 14/147,956

(22) Filed: Jan. 6, 2014

(65) Prior Publication Data

US 2014/0191859 A1     Jul. 10, 2014

(30) Foreign Application Priority Data

Jan. 7, 2013   (DE) .......................... 10 2013 200 082

(51) Int. Cl.
*B60Q 1/00*  (2006.01)
*H02J 7/00*  (2006.01)
*B60Q 1/26*  (2006.01)

(52) U.S. Cl.
CPC ............. *H02J 7/0047* (2013.01); *B60Q 1/2665* (2013.01); *B60Q 1/2669* (2013.01); *B60Q 2400/50* (2013.01)

(58) Field of Classification Search
CPC .... B60Q 1/2665; B60Q 1/2669; B60Q 3/023; B60Q 3/0233; G09F 19/22
See application file for complete search history.

(56) References Cited

U.S. PATENT DOCUMENTS

| | | | |
|---|---|---|---|
| 6,184,800 B1* | 2/2001 | Lewis | 340/932.2 |
| 7,175,321 B1* | 2/2007 | Lopez | 362/496 |
| 2005/0134441 A1* | 6/2005 | Somuah | 340/435 |
| 2007/0182536 A1* | 8/2007 | Prywes | 340/461 |
| 2010/0140244 A1* | 6/2010 | Chander et al. | 219/202 |
| 2012/0259546 A1* | 10/2012 | Kim | 701/527 |

* cited by examiner

*Primary Examiner* — Steven Lim
*Assistant Examiner* — Omeed Alizada
(74) *Attorney, Agent, or Firm* — David Kelley, Esq.; Tung & Associates

(57) ABSTRACT

A puddle light for a motor vehicle, in particular for a battery-operated motor vehicle, wherein the puddle light projects the status of charge of a drive battery of the vehicle onto a surface; and a method for projecting the status image.

20 Claims, 2 Drawing Sheets

PUDDLE LIGHT WITH STATUS DISPLAY

FIELD

The invention relates to a puddle light for a motor vehicle, and more particularly, relates to a puddle light for displaying a state of charge of a drive battery for a hybrid electric vehicle or a battery-powered electric vehicle.

BACKGROUND

It is generally known to provide so-called puddle lights in motor vehicles, which lights illuminate the immediate surroundings of the vehicle in the dark when the vehicle is being entered or exited. These lights, which are also referred to in the art as "ambient lights", can be mounted or inserted into the undersides of the door handles or exterior rear view (or side) mirrors so that they correspondingly illuminate the ground underneath. Frequently, these puddle lights are switched on when the doors are unlocked, for example by means of a remote key fob.

In addition, in electric vehicles it is known to display to the driver a charge status of the vehicle drive battery by means of suitable status lights in the dashboard so that the driver can detect and assess whether the battery has sufficient charge for the planned journey. These status lights usually do not display the state of charge to the driver until after the ignition has been switched on.

US 2010/0140244 A1 discloses a side mirror arrangement for a motor vehicle, wherein the motor vehicle has a device for controlling the heating of an engine and/or a battery in the motor vehicle, wherein the side mirror arrangement has: a base which is mounted on the motor vehicle, a mirror housing which extends from the base, an electrical terminal which is configured to receive electrical energy from an electrical energy source which is provided outside the motor vehicle and which is connected electrically to the device for controlling the heating of the motor and/or the battery in the motor vehicle. According to FIG. 7, the exterior rear view mirror can also contain an integrated display for the heating status.

FIG. 6 in U.S. Pat. No. 8,125,180 B2 discloses a corresponding display, for the state of charge of a battery.

OBJECTS

The object of the invention is to provide a puddle light for a motor vehicle, in particular, an electric vehicle that displays the status of the state of charge of the drive battery of the electric vehicle, which status display is conspicuous and functions without the vehicle being entered and activated.

SUMMARY

According to the invention, a puddle light is used to output and display, i.e., to project, the status of the drive battery on a surface, the driver can readily detect, before entering the vehicle, whether the drive battery is charged and whether the charge is sufficient for the planned journey.

For this purpose, double use is made of the puddle light which is usually provided in any case. As a result, in particular the ground surrounding the vehicle and a planar surface of the vehicle body, for example the door, are suitable as a projection surface.

Other surfaces which may be provided for projection are advantageously a ceiling and/or wall of a building surrounding the vehicle. In this context, the puddle light has light openings to the side and/or in the upward direction. The surrounding building may be a garage, a multistory car park, a car port, a bridge or a tunnel. The puddle light can preferably then illuminate the surrounding building if the location within such a building is detected by the vehicle on the basis of the position or of other detection features, or the driver consciously selects this type of illumination of the surroundings.

The puddle light is preferably integrated into the side mirror or door handle of the motor vehicle so that a distance from the vehicle is generated which is necessary for illuminating a sufficient projection surface. The side mirror is particularly preferred since the housing thereof has space for a corresponding lighting arrangement and is at a relatively large distance from the ground and from the vehicle.

The puddle light can appropriately be switched between the pure lighting function and the status function if the status function is undesired.

The displayed status of the drive battery usually also comprises, in addition to the state of charge of the drive battery, information about persistent charging, for example by means of a plug symbol. The status information can also comprise further battery-related information such as, for example, the predicted range on the basis of the previous driving style and distance travelled, battery temperature, etc.

The status of the drive battery can be displayed in color, by a flashing light, etc. A segment-like display can also be provided here with percentage information, or a clock-like circular segment display is also conceivable.

The lighting is preferably implemented by means of LED technology since LED lights have a long service life and consume little energy.

The technical refinement of the puddle light for outputting the status information can be implemented in various ways. A light arrangement in which an LED lights a transparent display or a camera closure in such a way that the LED projects the status as an image (or shadow) onto the projection surface is conceivable. The transparent or else translucent display may be a LCD display here. The lighting arrangement can also comprise lenses for focusing and adjusting the size of the display on the projection surface.

The puddle light preferably comprises a controller for outputting the status for actuating the lighting arrangement on the basis of the information about the status of the drive battery.

Correspondingly, the invention also comprises an arrangement composed of a battery-operated motor vehicle with a drive battery and a battery-charging and control circuit as well as a puddle light according to the invention, wherein the battery-charging and control circuit is connected to the puddle light or the controller thereof in order to output the status of the drive battery.

BRIEF DESCRIPTION OF THE DRAWINGS

Further features and details of the invention can be found in the following description of the drawing, in which.

DETAILED DESCRIPTION

Figure 1:
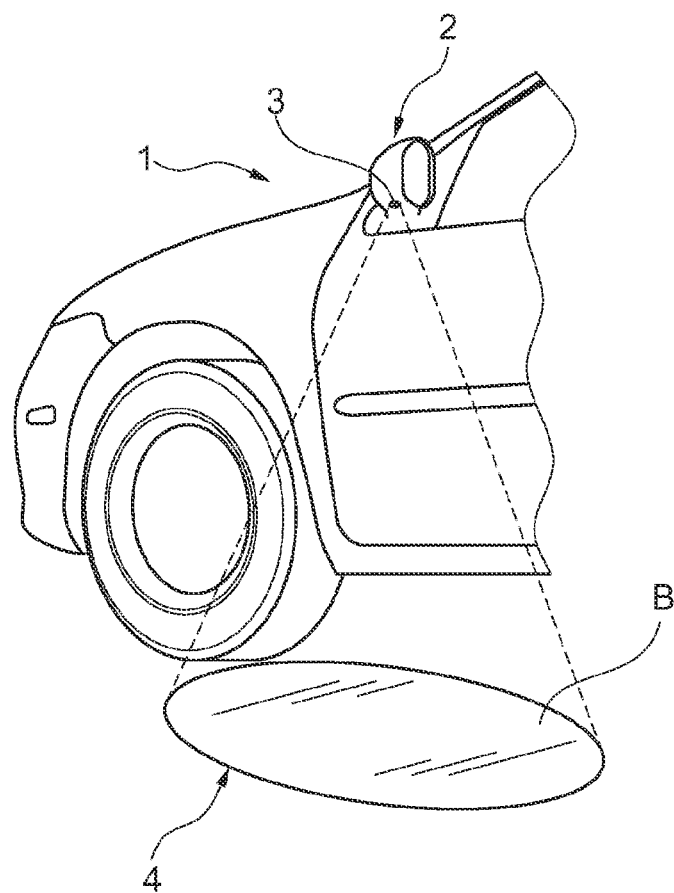
FIG. 1 shows a partial perspective view of a passenger car with an exterior rear view mirror with a puddle light according to the invention.
Figure 2:
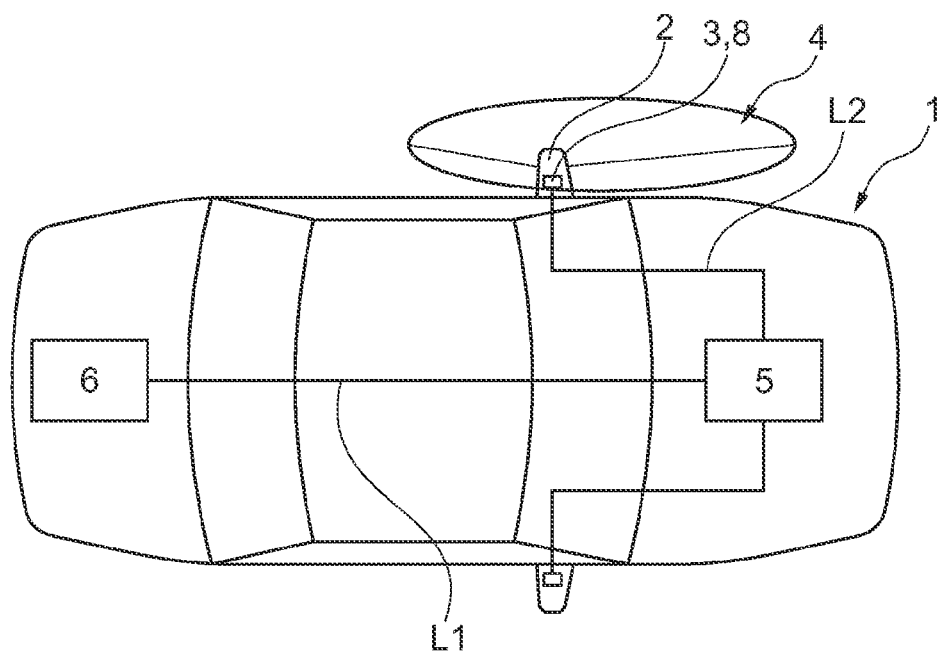
FIG. 2 shows a plan view of the passenger car of FIG. 1.

The figures show an electrically operated passenger car which is referred to in its entirety by 1 and which comprises a driver-side exterior rear view mirror 2 which is equipped on the underside of its housing with a a puddle light 3 which lights an area 4 on the ground B underneath the exterior rear view mirror 2 and next to the vehicle 1.

The passenger car 1 also comprises a drive battery 6 which is arranged in the rear region of the vehicle when viewed in the direction of travel, and a controller 5 which simultaneously controls or makes available a charge circuit, battery management system and display of the battery status information and is connected, to the on-board electronics (not illustrated).

For this purpose, the controller is connected, on the one hand, electronically to the battery 6 via line L1 and, on the other hand, by means of line L2 to a lighting arrangement 8 which serves to project the status information of the drive battery 6 onto the ground B.

Figure 3:
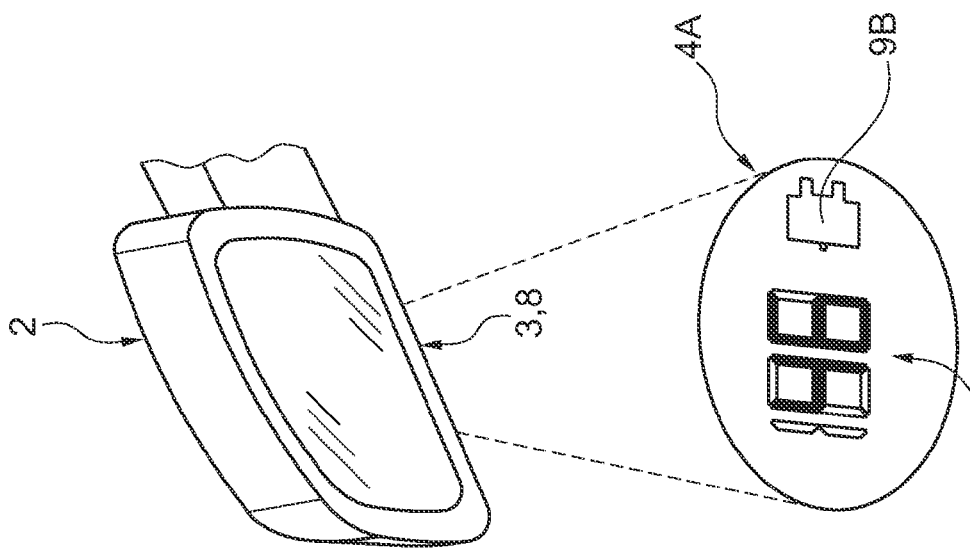
FIG. 3 shows a view of a first embodiment of the status display.

The status information of the drive battery 6 can be displayed by means of the lighting arrangement 8 into the illuminated area 4 on the ground B in the form of a segment display 4A with numbers as percentage information for the state of charge (shown in FIG. 3). The display 4A is therefore composed of segments 9A which represent a number between 0 and 100. In addition, another symbol 9B is arranged which indicates if the drive battery is being supplied with charge current at that moment, and/or whether the connection has been made to the charging station, if, for example, the vehicle is plugged in.

Figure 4:
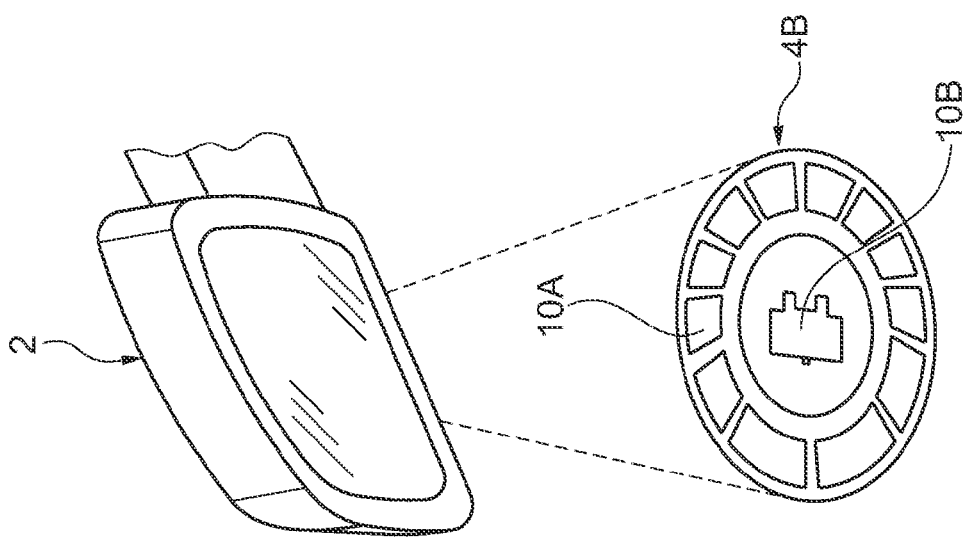
FIG. 4 shows a view of a second embodiment of the status display.

Alternatively, as shown in FIG. 4, the display 4B can display the state of charge in the form of block-like circular segments 10A, in a way analogous to a clock. The more segments 10A are displayed, the higher the charge of the drive battery 6. In accordance with FIG. 4, a symbol 10B can likewise display the instantaneous charge of the battery 6.

The display 4 can therefore be activated by a remote key fob when the passenger car is unlocked, with the result that the status of the drive battery 6 is projected for the driver on the ground of the driver's side. As a result, the driver can readily check the charge status of the drive battery 6 before entering the vehicle. Alternatively or additionally, the display can also be arranged on the front seat passenger's side.

Figure 5:
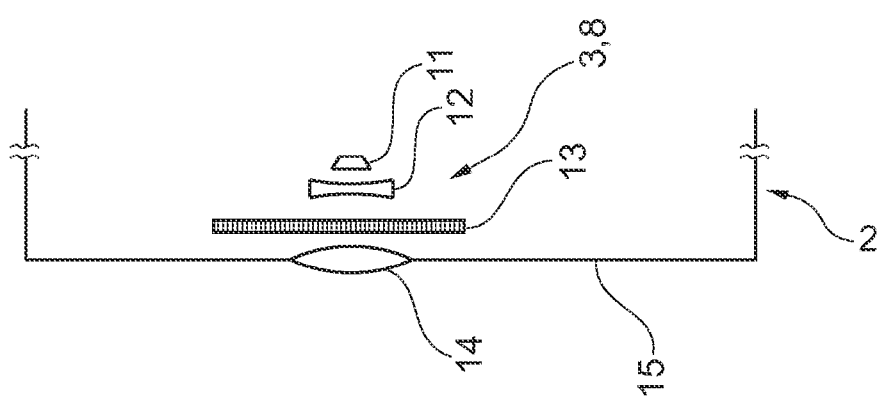
FIG. 5 shows a cross-sectional view of a lighting arrangement in an exterior rear view mirror.

In order to generate the display 4 on the ground, the lighting arrangement 8 can, in accordance with FIG. 5, be composed of an LED 11 as a light source, a first lens 12, a transparent LCD display 13 and a second lens 14 in the lower housing wall 15 of the exterior rear view mirror. The lighting arrangement is controlled by means of the controller 5, as previously described.

The controller 5 controls the display 13 in such a way that it displays the corresponding representation of the desired display 4A and 4B. The light from the LED 11 then illuminates in a focused fashion through the display 13, and the result is focused in turn onto the ground B by means of the lens 14.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A puddle light for a motor vehicle comprising:
a projection lens, the projection lens configured to project a status image onto a surface that is not integral with the puddle light, the status image comprising currently updated status information associated with a battery of the vehicle, the status image configured to be projected to be visible external to the vehicle without operating the vehicle.

2. The puddle light of claim 1, wherein said motor vehicle is a hybrid electric vehicle or an electric vehicle.

3. The puddle light of claim 2, wherein said status image is a status of charge (SOC) of a drive battery for said motor vehicle.

4. The puddle light of claim 1, wherein the surface is the ground surrounding the vehicle or a surface of the vehicle body panel.

5. The puddle light of claim 1, wherein the surface is a ceiling or wall of a building surrounding the vehicle.

6. The puddle light of claim 1, wherein the projection lens is integrated into a side mirror or a door handle of the motor vehicle.

7. The puddle light of claim 1, wherein the puddle light is further configured to be switched between a pure lighting mode and a status image mode.

8. The puddle light of claim 1, wherein the puddle light is further configured to display the status image in color or in flashing lights.

9. The puddle light of claim 1, wherein the status image comprises a state of charge of a drive battery shown in percentages.

10. The puddle light of claim 1, wherein an LED light source is configured to form the status image.

11. The puddle light of claim 1, wherein the puddle light comprises a lighting arrangement in which an LED is configured to light a transparent display or a camera closure such that said LED projects the status image.

12. The puddle light of claim 1, wherein the puddle light further comprises a controller, the controller configured to output the status image.

13. The puddle light of claim 3 further comprising a battery charging and control circuit in electrical communication with said puddle light and said drive battery, the battery charging and control circuit configured to output the status of charge.

14. A method for projecting a status image of a motor vehicle into a surface comprising:
mounting a status image forming device into a component of the vehicle, and
projecting said status image onto a surface juxtaposed to said vehicle or a surface of said vehicle, the status image comprising currently updated status information associated with a battery of the vehicle, the status image configured to be projected to be visible external to the vehicle without operating the vehicle.

15. The method of claim 14 further comprising mounting a projection lens and a light source into said component of the vehicle.

16. The method of claim 14 further comprising selecting said component of the vehicle from the group consisting of a side mirror and a door handle.

17. The method of claim 14 further comprising mounting a projection lens and a LED light source into said component of the vehicle.

18. The method of claim 14 further comprising projecting said status image onto a ground surface, said ground surface comprising the surface juxtaposed to said vehicle.

19. The method of claim 14 further comprising projecting said status image onto a body panel of said vehicle.

20. The method of claim 14 further comprising projecting a status of charge of a drive battery of said motor vehicle, the status of charge comprising the status image.

* * * * *